United States Patent [19]
Fahrner

[11] 4,335,986
[45] Jun. 22, 1982

[54] VEHICLE BODY SURFACING AND DOLLY ASSEMBLY

[76] Inventor: Donald A. Fahrner, 203 Zephyr, Huntsville, Ala. 35801

[21] Appl. No.: 70,515

[22] Filed: Aug. 28, 1979

Related U.S. Application Data

[63] Continuation-in-part of Ser. No. 837,007, Sep. 27, 1977, abandoned.

[51] Int. Cl.³ .............................................. B23C 1/16
[52] U.S. Cl. .................... 409/116; 409/118; 409/125
[58] Field of Search ............... 409/104, 111, 112, 121, 409/124, 116, 117, 118, 107, 108, 125

[56] References Cited

U.S. PATENT DOCUMENTS

| | | | |
|---|---|---|---|
| 2,702,496 | 2/1955 | Davis et al. | 409/124 |
| 2,800,839 | 7/1957 | Horlacker | 409/118 |
| 2,811,085 | 10/1957 | Burke | 409/118 |
| 2,863,361 | 12/1958 | Daugherty | 409/117 X |
| 3,241,454 | 3/1966 | Medley, Jr. | 409/116 X |
| 3,340,772 | 9/1967 | Weaver | 409/118 |
| 3,763,743 | 10/1973 | Vertin | 409/118 X |

*Primary Examiner*—William R. Briggs
*Attorney, Agent, or Firm*—Larson and Taylor

[57] ABSTRACT

In one embodiment, a sender unit is attached to the portion of the body corresponding to the damaged opposite portion and a surfacing unit is attached to the damaged portion. A sending head is traversed horizontally and vertically, either separately or simultaneously in a composite motion, over the undamaged portion of the body and this sender head is provided with a plurality of surface contacting probes which follow the contour accurately. Each probe moves upwardly and downwardly following the contour of the body and transmits these movements by flexible cable to the surfacing unit. The surfacing unit is provided with a surfacing head which also traverses the damaged area horizontally and vertically in synchronization with the movement of the sending head. The surfacing head is provided with a plurality of chisel like cutters which are moved upwardly and downwardly by the vertical movement of the sender probes so that the cutters follow the contour of the undamaged surface and cut away filler material which has been placed on the damaged surface. This enables the filler material to be contoured rapidly and easily using the undamaged corresponding body portion as a template. In another embodiment, the cutters are replaced by small anvils which once again traverse the damaged portion and act as a dolly for initial straightening of the damaged portion.

16 Claims, 23 Drawing Figures

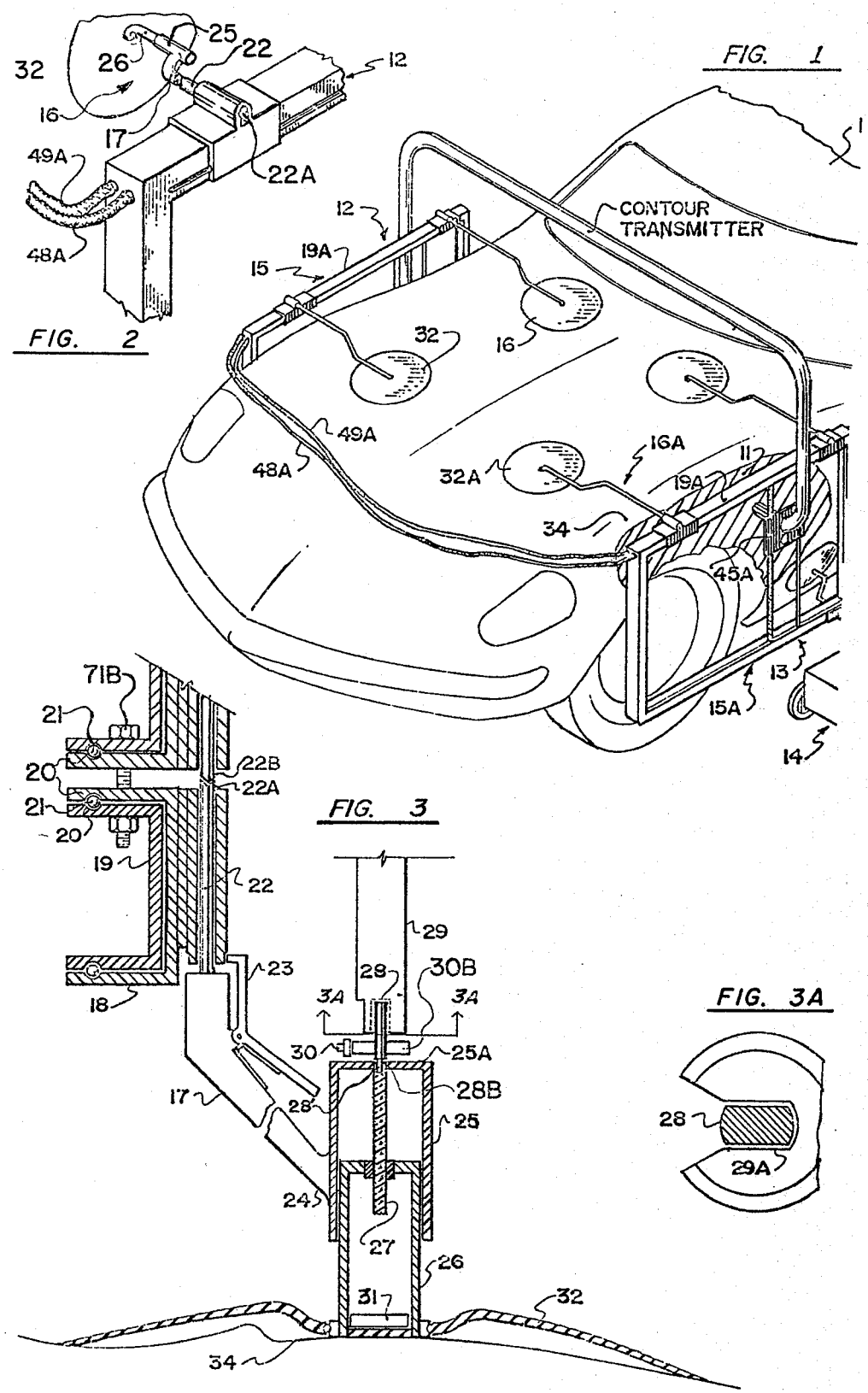

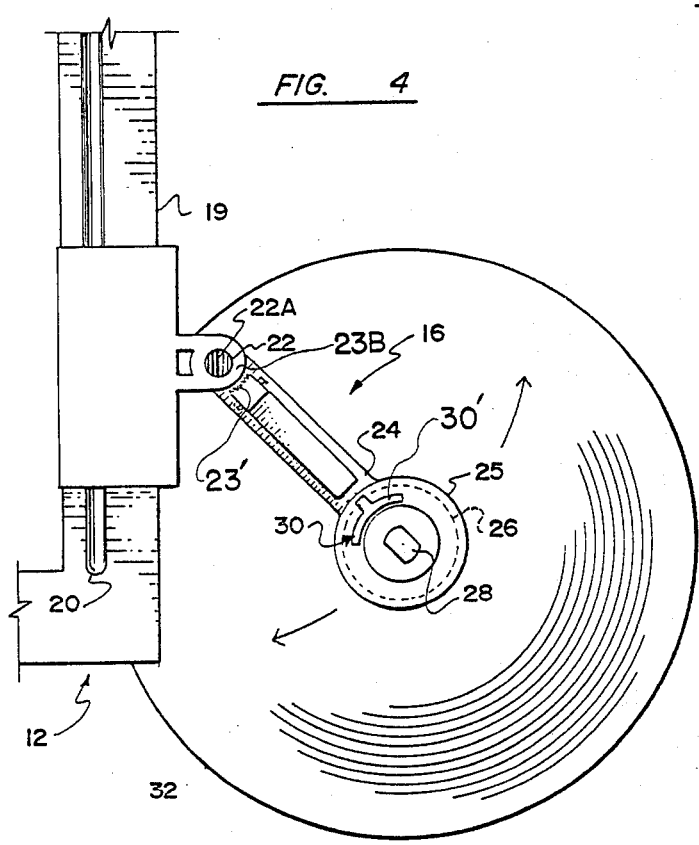
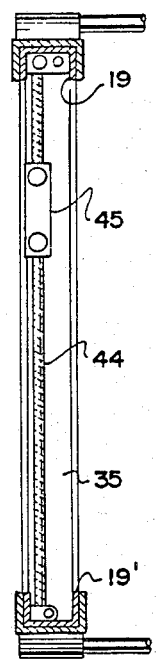
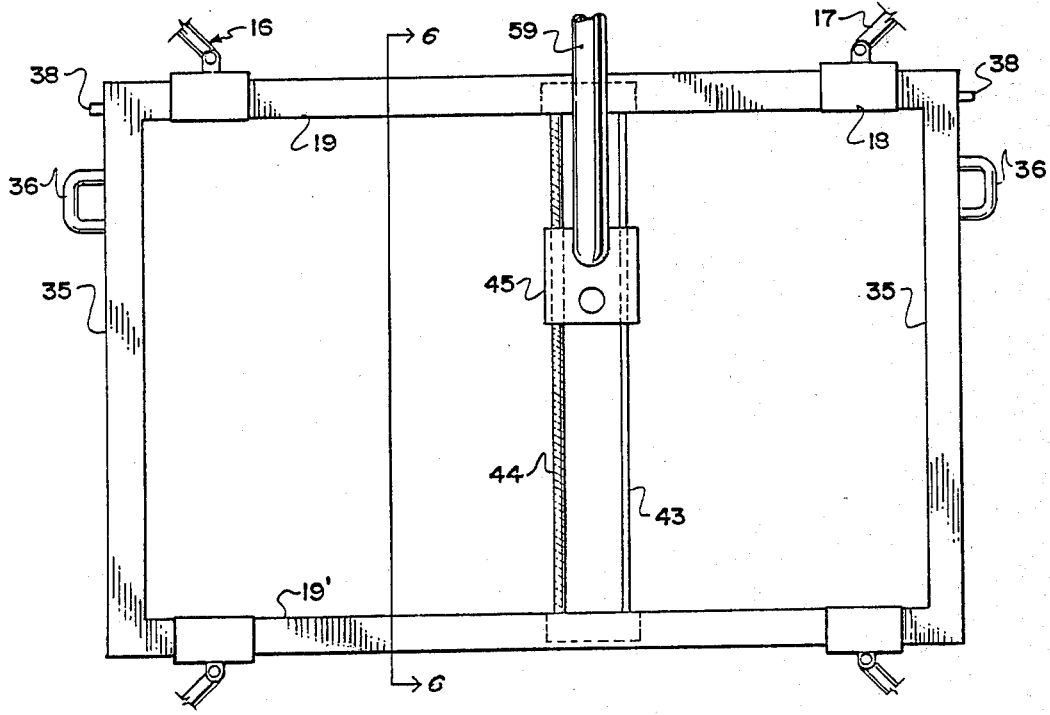

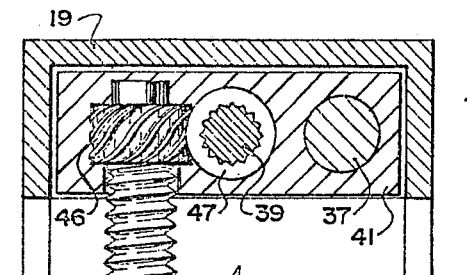
FIG. 7
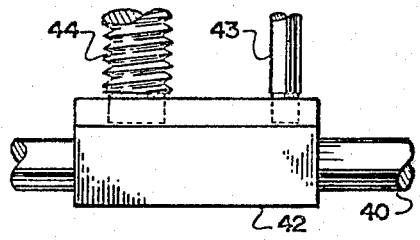
FIG. 8
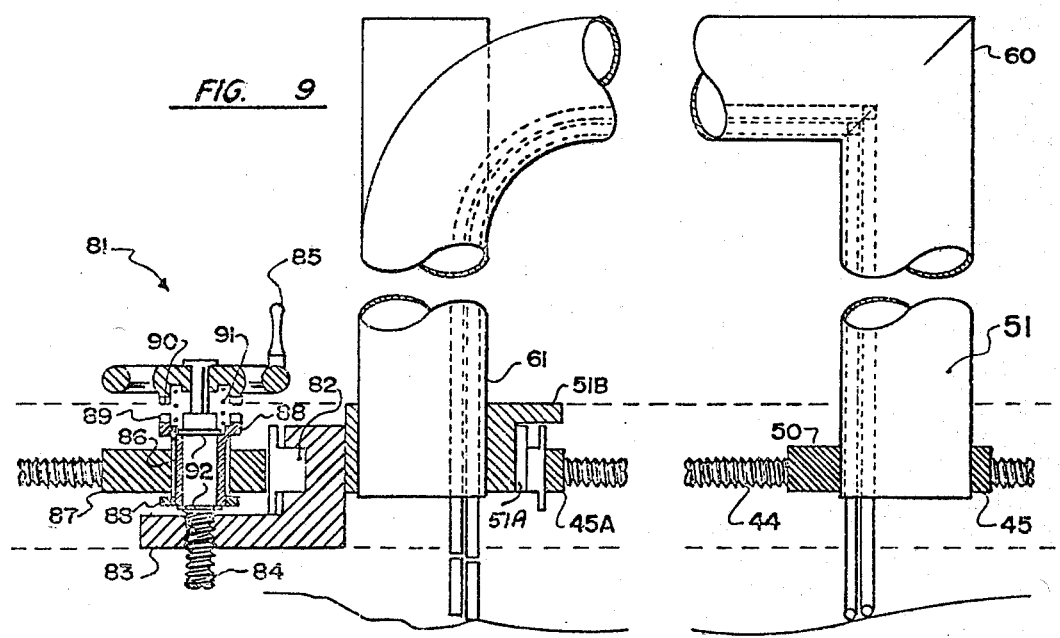
FIG. 9
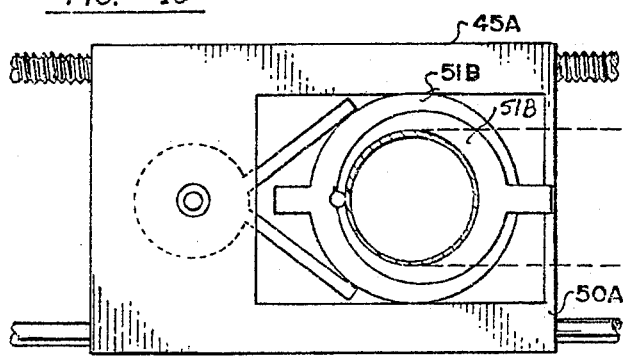
FIG. 10
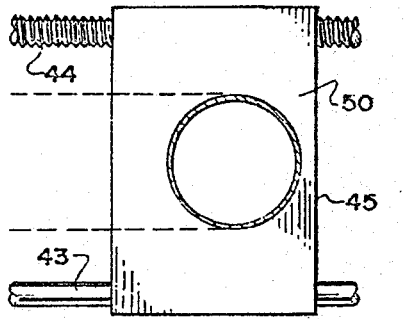

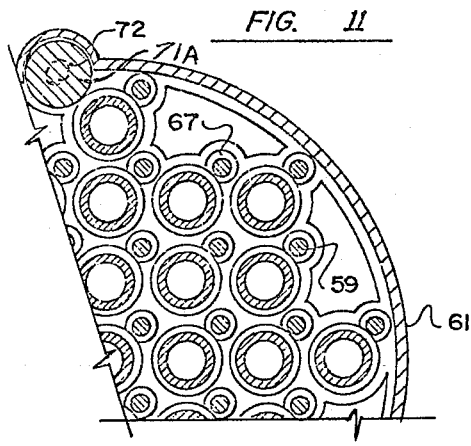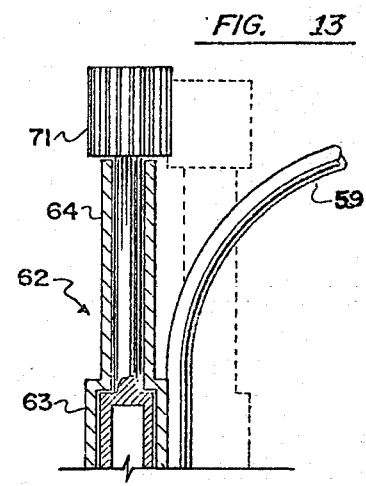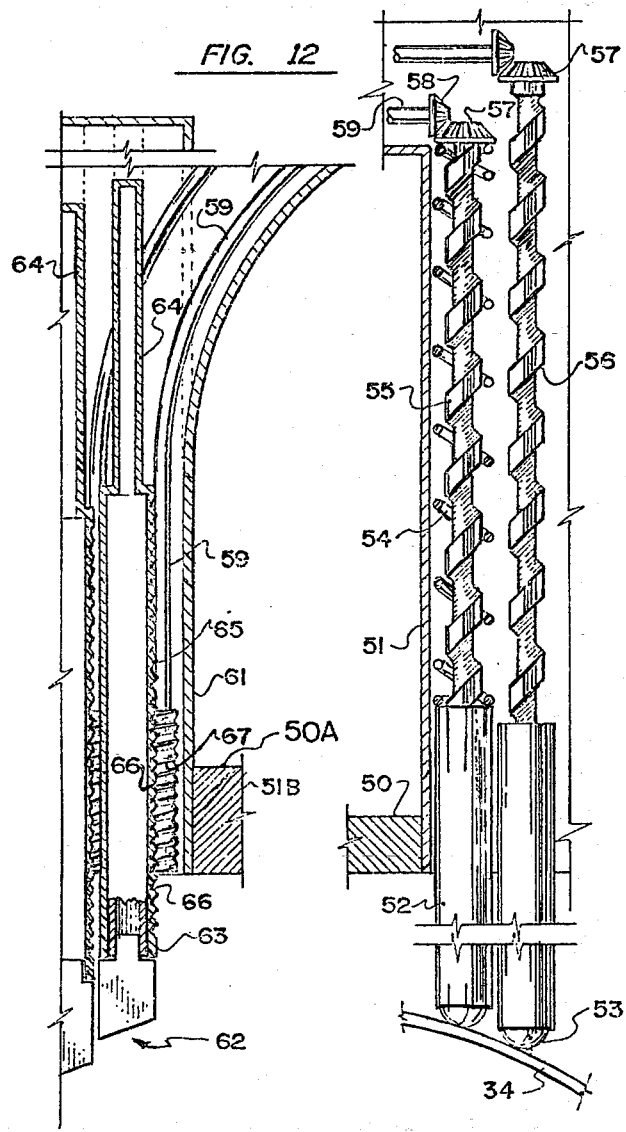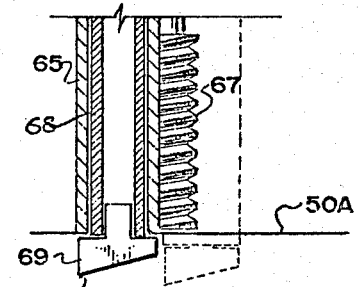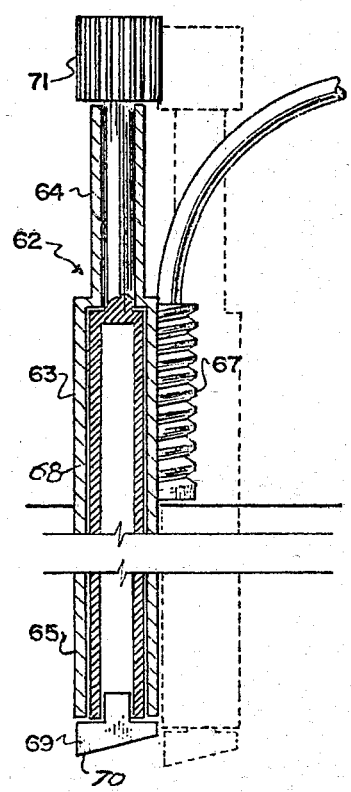

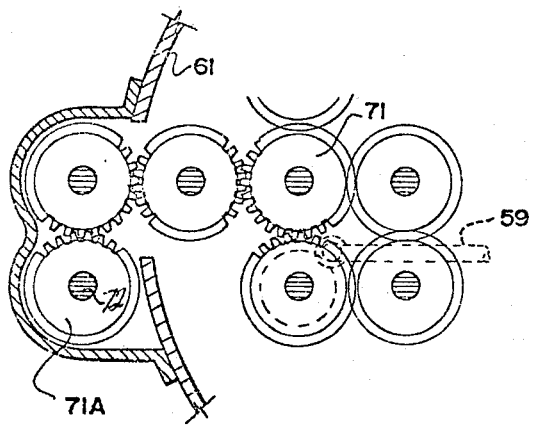
FIG. 15
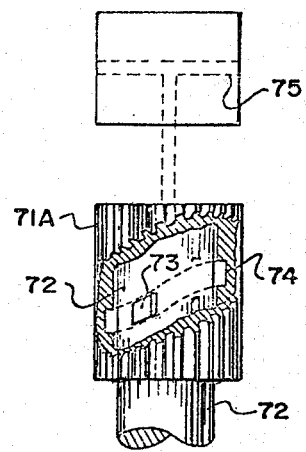
FIG. 16
FIG. 17
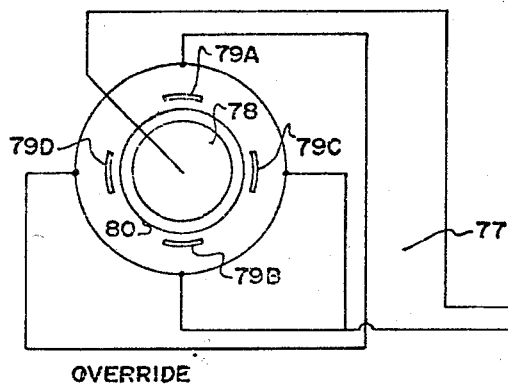
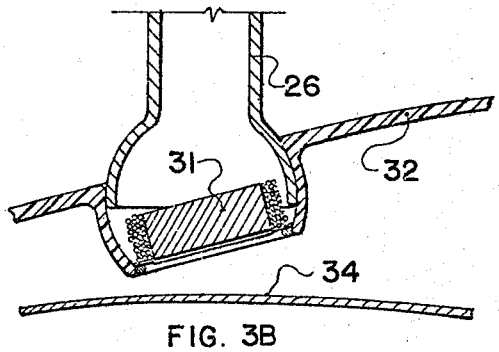
FIG. 3B
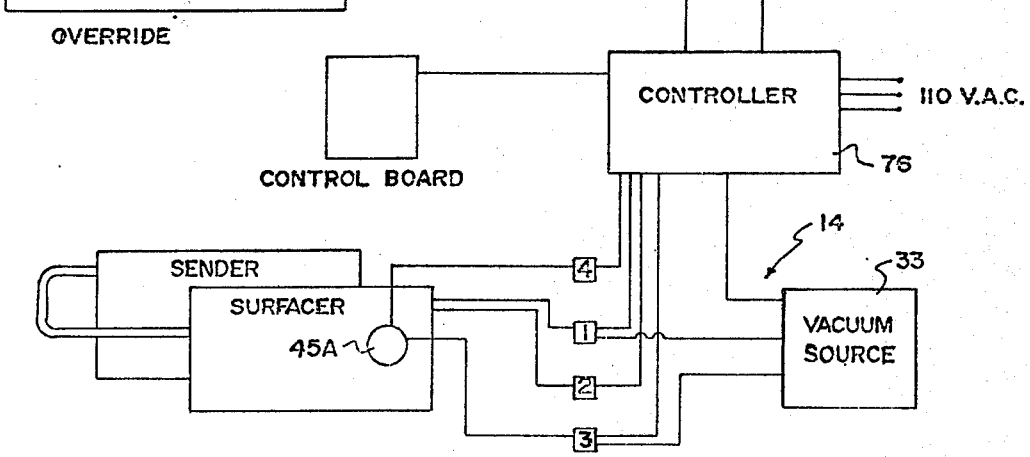

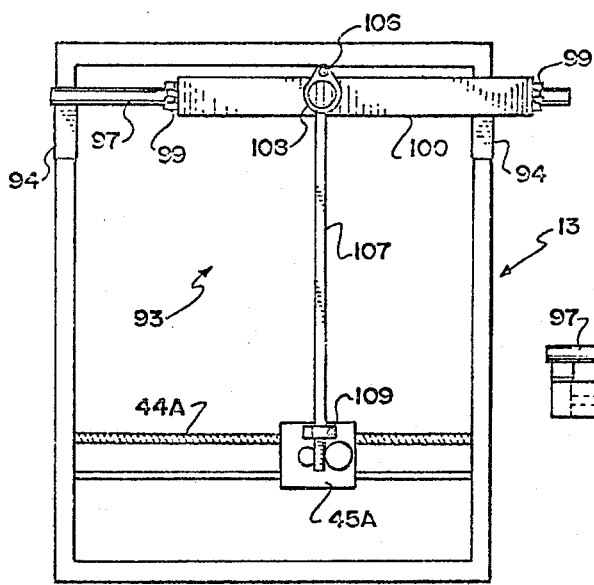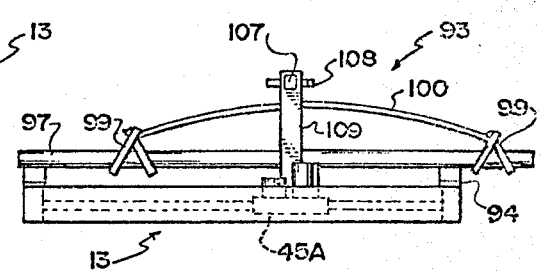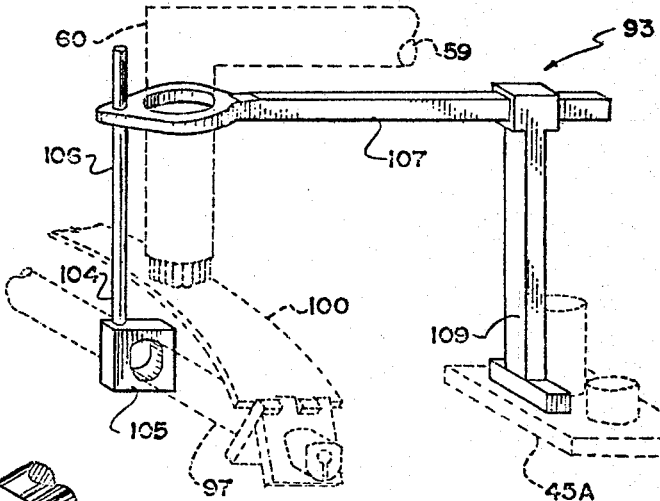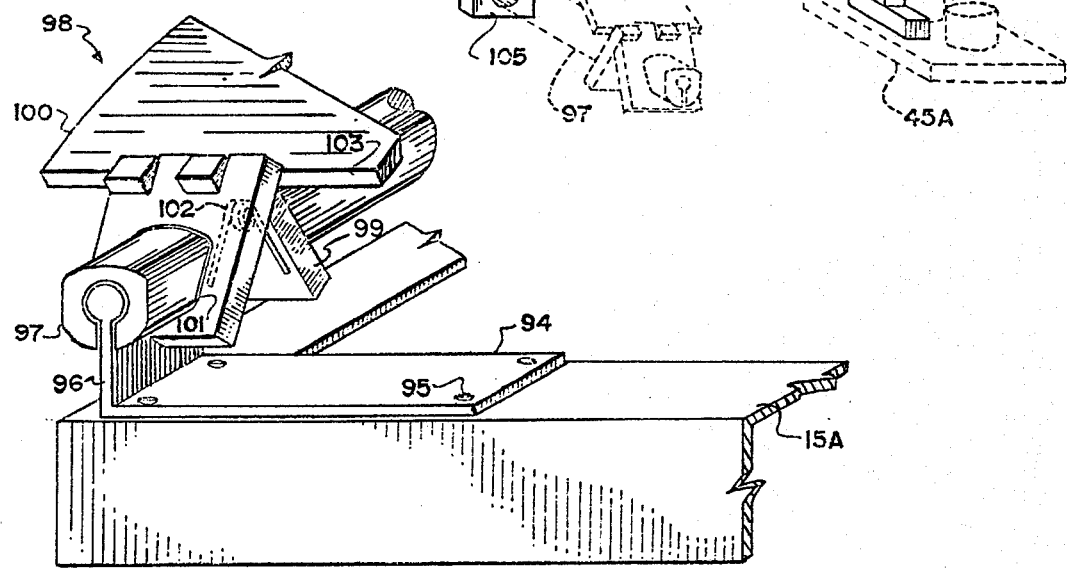

VEHICLE BODY SURFACING AND DOLLY ASSEMBLY

BACKGROUND OF THE INVENTION

This invention relates to new and useful improvements in devices which facilitates the repair to body work of cars, trucks and the like and is a continuation-in-part application of Ser. No. 837,007 filed in the United States Patent Office on Sept. 27, 1977 now abandoned.

At the present time, it is conventional, with minor damage, to fill same with a filler and then to surface this filling material prior to painting. With more severe damage, dollies are used to back up the material which is then hammered into the approximate contour whereupon once again filler material is used and surfaced by hand.

In both instances, it is sometimes difficult to match the contour of the damaged surface with the contour of the original portion of the body work. This is particularly true when a double curved contour is being repaired such as on a fender or the like.

This means that the contour surfacing prior to painting is a laborious and time consuming portion of the repair operation.

SUMMARY OF THE INVENTION

This invention overcomes these disadvantages by providing a light weight and largely portable surfacer for body vehicle reshaping, and other ancillary repair which will effectively perform most of the handwork.

In one embodiment, it will consist of two similar components, one a sending unit and the other a surfacing unit with a connection to transmit contour from the sending unit to the surfacing unit.

In single component usage, either the sending unit or surfacing unit can be used as a dolly or re-finisher or in other operations. An operator should therefore be able to prepare most surfaces more accurately and with much less time.

The principal object and essence of the invention is therefore to provide a device of the character herewithin described which enables the sending unit to be placed on a portion of the vehicle body matching the damaged portion and to use the undamaged portion as a contour template to transmit contour information mechanically to the surfacing unit which is affixed over the corresponding damaged portion of the vehicle body.

Another object of the invention is to provide a device of the character herewithin described which enables the filler material to be machined accurately to the contour of the portion of the vehicle body being used as the template for the sending unit.

Still another object of the invention is to provide a device of the character herewithin described in which either the sending or surfacing units can be used as a dolly to back up the damaged portion of the vehicle body prior to filling and resurfacing.

Still another object of the invention is to provide a device of the character herewithin described which will facilitate the preparation of damaged vehicle body surfaces, which is relatively economical and which is otherwise well suited to the purpose for which it is designed.

In accordance with the invention there is provided a vehicle body surfacing assembly for use with a source of power and upon a vehicle body comprising a sending unit and a surfacing unit. Means are provided to detachably secure said surfacing unit over the area of the vehicle body requiring repair and further means are provided to detachably secure said sending unit over means on the body having contours similar to the contours of the portion of the vehicle body requiring repair. Each of the units includes a rectangular frame with a carriage mounted on each of the frames for movement relative thereto in two directions at right angles to one another. Means are also provided operable to move the carriages connected to a source of power. A plurality of movable surface sensing element assemblies are mounted in the carriage of the sending unit and contacting the means having contours similar to the contours of the portion of the vehicle requiring repair. Each of these sensing element assemblies each includes a surface sensing element movable in a direction perpendicular to the plane of the frame of the sending unit. A plurality of surfacing components are mounted in the carriage of the surfacing unit movable in a direction perpendicular to the plane of the frame of said surfacing unit and contour transmitting drive cable means operatively extend between each of the surface sensing elements and a corresponding surfacing component whereby movement of each of the surface sensing elements in a direction perpendicular to the plane of the frame is reproduced in the corresponding surfacing component. Each of the surfacing components is provided with a treatment surfacing means on the lower end thereof operatively engaging the surface of the vehicle body requiring repair.

With the foregoing in view, and other advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is a schematic isometric view of the front portion of a vehicle showing the device installed thereon.

FIG. 2 is an enlarged fragmentary isometric view showing a detail of the surfacer leg in working position.

FIG. 3 is a fragmentary sectioned side elevation of one of the attaching legs.

FIG. 3A is an enlarged underside view of the connector between legs of two corresponding legs of the sender and surfacing units.

FIG. 3B is a fragmentary enlarged view of the preferred connection of the suction cup to the attaching leg.

FIG. 4 is a top plan view of FIG. 3.

FIG. 5 is a top plan view of one of the frames per se.

FIG. 6 is a side sectional view of FIG. 5 along the lines 6—6 of FIG. 3.

FIG. 7 is an enlarged fragmentary view similar to FIG. 6 but sectioned in part.

FIG. 8 is an enlarged fragmentary view of the attachment of the lower side of the carriage to the frame which travels in the frame member.

FIG. 9 is a fragmentary partially schematic enlarged view of one portion of the sending and surfacer heads.

FIG. 10 is a fragmentary partially schematic top plan view of the surfacer carriage enlarged with respect to FIG. 1.

FIG. 11 is a fragmentary schematic top plan view of part of the surfacer component enlarged with respect to FIG. 10.

FIG. 12 is a fragmentary schematic view showing the connection between a sending unit probe and a surfacing unit surfacer element.

FIG. 13 is a fragmentary schematic view of one of the surfacing components in the uppermost position.

FIG. 14 is a view similar to FIG. 13 but showing the unit in the lowermost position.

FIG. 15 is a fragmentary schematic top plan view showing the interconnection between surfacing units.

FIG. 16 is a fragmentary schematic view showing the method of rotating the surfacing units.

FIG. 17 is a schematic view of the drive connections to the device.

FIG. 18 is a top plan view of the bow assembly.

FIG. 19 is an end view of FIG. 18.

FIG. 20 is a fragmentary isometric view of one end of the bow assembly.

FIG. 21 is a fragmentary isometric view of the positioning arm and leg of the bow assembly.

In the drawings like characters of reference indicate corresponding parts in the different figures.

BRIEF DESCRIPTION

Referring first to FIG. 1, reference character 10 illustrates the front part of a vehicle with an area 11 having been damaged.

A sending unit collectively designated 12 is secured to the corresponding portion of the vehicle body on the opposite side of the damaged portion 11, and a surfacing or dolly or anvil unit collectively designated 13 is secured to the corresponding position adjacent the damaged area 11 and connected to a source of power collectively designated 14 and shown schematically in FIG. 17.

DETAILED DESCRIPTION

In detail, the construction of units 12 and 13 are similar and where common components occur, the corresponding components in the surfacing unit 13 will be provided with a suffix "A".

Each unit 12 and 13 comprises a substantially rectangular frame 15 and 15A detachably securable to the vehicle body by a plurality of leg attaching devices collectively designated 16 and 16A. Reference to FIGS. 3 and 4 will show details of the leg assemblies 16 and 16A. An attachment bracket 17 extends from a channel section slider 18 which in turn engages over one of the longitudinal frame members 19 of the frame 15. Both the channel member 18 and the frame member 19 are provided with longitudinally extending channels 20 carrying enclosed balls 21 to facilitate the sliding movement of the channel 18 longitudinally along the frame member 19 and means (not illustrated) are provided to detachably lock the channel 18 in position upon the frame member 19.

The bracket 17 is pivotally secured to the channel 18 for rotational movement when viewed in plan (see FIG. 4) a pivot pin 22 connecting the two parts together with the pin being secured to bracket 17, and a locking lever 23 operatively reacts between the bracket 17 and the channel 18 to detachably lock the bracket in the desired radial relationship relative to the channel 18. One method comprises a toothed end 23′ (FIG. 4) frictionally engaging the housing 23B or serrations (not illustrated) on this housing.

The bracket 17 includes an offstanding arm portion 24 carrying a tubular member 25 upon the distal end thereof engaging over an endwise movable tubular member 26 and being interconnected by means of a screw 27 screw threadably engaging through the upper end of the tubular member 26. The outer end 28 of the screw extends upwardly through the outer end of the tubular member 25 and is annularly grooved as at 28′. The walls of an aperture 28B engage this groove and allow rotation of the screw but prevent endwise movement of the screw relative to the tubular member 25. The screw may be engaged by a connector 29 as will hereinafter be described and also may be retained in the desired relationship by means of a brake shown schematically by reference character 30 in FIG. 3. This brake may be operated mechanically or electromagnetically so that the shoe 30′ engages the collar 30B secured to the upper end of screw 27. Rotation of screw 27, due to the steep pitch thereof, by endwise pressure upon member 26, raises or lowers the tubular member 26 relative to the tubular member 25. An electromagnetic attaching block 31 is secured to the lower end of tubular member 26 and a conventional circular vacuum cup assembly 32 surround the lower end of the tubular member 26 and is secured for limited universal connection in the form of a ball joint type connection. It may be connected to a source of vacuum 33 within the source of power 14, although the natural action of the shape of cup 32 gives a certain amount of attachment by suction.

The electromagnetic block assists in attaching the leg to the vehicle body surface 34 and when positioned correctly, the vacuum 32 assists in holding the leg firmly to the surface.

It will be observed that there are four adjustable leg assemblies 16 and 16A on the frames 15 and 15A respectively, all of which may be adjusted so that a firm three or four point connection may be obtained for each of the sending and surfacing unit.

Means are provided so that, if desired, the leg lengths of the units 12 and 13 can be equalized and positioned radially to the same degree in order to facilitate the attachment of both units to either side of the vehicle. The portions constituting the contour transmitter (hereinafter to be described) are detached from their supports (screw plates 50 and 50A) thus making the frames less unwieldy and giving sufficient room for the frames to be placed back to back. The two units are first clamped by the frames thereof in back to back relationship either by holding them manually or by simple clamps such as nut and bolt assemblies 71B. During this action, the four legs are positioned in corresponding positions so that adjacent legs are interconnected one with the other. This interconnection takes the form firstly of the outer ends of the pivot pins 22 and secondly by means of connectors 29.

The outer ends of the pivot pins of one of the units is provided with a V formation 22A and the outer ends of the corresponding pivot pins of the other unit are chamfered or slightly pointed so that they will engage within the V grooves thus giving a temporary connection between the two when back to back, so that rotation of one gives corresponding rotation of the other, and linear movement of one along one frame member 19 will slide the other leg along the corresponding frame member.

The outer ends 28 of the screws 27 are provided with flattened sides as shown in FIG. 3A and the distal ends of the connector 29 are slotted to engage over these flattened sides as clearly shown by reference character 29A, it being understood that when the two units are back to back, the connections 29 engage the outer ends of the corresponding screws 27 and connect them temporarily.

The screw threads of the screws 27 are shaped or pitched so that outward or inward movement of one sleeve or cylinder 26, relative to cylinder 25, causes these screws to rotate and as they are bearably mounted for rotation within the outer ends 25A of the sleeves 25, the screws rotate within sleeves 25 and also rotate the connectors 29. Because the screws cannot move endwise relative to sleeves 25 as hereinbefore described, rotation of a connector 29 by one of the screws 27 in one leg, will rotate the screw of the other leg to which it is temporarily connected thus moving the cylinder 26 of the other leg the same amount as the cylinder 25 of the one leg.

Once the units are clamped in back to back relationship with the corresponding legs of each interconnected by the connectors 29, the legs of the surfacing unit are positioned manually so that the pads 32 engage the surface of the metal surrounding the damaged portion. These adjustments may take the form of linear movement along the frame portions 19, radial adjustment around pivot pins 22 and in and out adjustment of the suction pads 32 relative to the cylinders 25 connected to brackets 17, all of which movements are automatically transmitted to the corresponding legs of the sender unit as hereinbefore described. When the three or four legs of the surfacing unit are correctly positioned, brake 30 may be applied and the locks 23 released so that they lock the brackets 17 radially with respect to pivot pins 22. At the same time the clamps (not illustrated) lock the portions 18 relative to the frame members 19.

The sender unit is then detached from the surfacing unit and moved to the opposite side of the vehicle and positioned so that the three or four legs accurately engage the multi-curved surface of the other side of the body thus locating the sender unit in the correct position relative to the surfacing unit whereupon it may be attached to the body or fender by the electromagnetic block 31 and the vacuum cups 32.

Reference should next be made to FIGS. 5 through 8 which illustrate one of the units 12 or 13, it being understood that they are similar insofar as these particular views are concerned.

The rectangular frames collectively designated 15 and 15A include the upper and lower longitudinally extending members 19 together with the end frame members 35, said end frame members including manipulating or carrying handles 36.

Situated within the channel making up member 19, is a horizontal drive screw 37 journalled for rotation through the ends 35 of the frame and extending beyond the frame in the form of extensions 38. Spaced and parallel from this horizontal drive screw 37 is a shaft rod 39 also journalled for rotation in the ends 35 of the frame.

A steady or support rod 40 is situated within the channel 19' and also is mounted at the ends of the frame.

A support block 41 is slidably mounted upon the shaft rod 39 and also bears on frame member 19, and is apertured and provided with an internal thread engageable around the drive screw rod 37 so that rotation of the drive screw rod 37 will cause the block 41 to move longitudinally along the drive screw rod between the frame ends 35 supported by the shaft rod 39 and frame member 19.

A support block 42 slidably engages over the steady or support rod 40 and a further steady or support rod 43 extends between the block 41 and the block 42.

A screw drive rod 44 also extends between block 41 and 42 so that movement of block 41 by rotation of the screw drive rod 37, not only moves block 41 horizontally between the ends 35 but also the other block 42 together with the steady rod 43 and the screw drive rod 44.

A carriage 45 is mounted upon the steady or support rod 43 and is apertured and engages over the screw threaded rod 44 and is provided with internal screw threading adapted to complement the screw threading of rod 44. Rod 44 is journalled for rotation by one end thereof within block 42 and by the other end thereof within block 41. The end within block 41 is provided with a gear 46 meshing diagonally on perpendicular axes with corresponding gear 47, slidable along the shaft rod 39 which is splined so that rotation of the shaft rod also rotates the corresponding gear 47 and hence the drive rod 44.

The ends of the shaft rod (not illustrated) also extend beyond the frame similar to the extension 38 hereinbefore described and all of these extending ends are preferably splined (not illustrated) and provided with quick connect means of a conventional nature to the drive means as will hereinafter be described.

From the foregoing it will be appreciated that rotation of the drive screw 37 will move the carriage 45 across the frame between the ends 35 and rotation of the shaft rod 47 will move the carriage vertically relative to the frame between the side frame members 19 and 19' or in a direction perpendicular to the movement between the ends 35, but in the same plane.

In this particular embodiment, flexible drive shafts 48 and 49 such as conventional cable assemblies having a fixed outer casing and a rotatable inner cable, extend from the source of power 14 with one of them being connected to one end 38 of the drive screw 37 by means of a conventional quick connection and the other being connected in a similar way to the corresponding end of the shaft rod 39 (not illustrated).

Reference to FIG. 1 will also show that further flexible drive cables 48A and 49A extend from the opposite ends of the shafts or rods 37 and 39 to extending ends of similar shafts on the other unit 12 as shown in FIG. 2 thereby giving exactly the same relative movement to the carriage 45A on the unit 22.

Dealing next with the sender unit specifically, the carriage 45 includes a substantially planar screw plate 50 shown in FIGS. 9 and 12.

A plurality of fixed cylindrical casings 51 are detachably secured to and extend upwardly from the screw plate 50 and each casing is provided with a tube or element 52 slidable therein and splined to prevent rotation of the tube 52 relative to the casing 51. For clarity, this spline is not shown in the drawings.

A surface sensing element or component in the form of a ball 53 is journalled for rotation within the lower end of tube 52 and contacts the surface 34 of the vehicle body when the sending unit is in position. These tubes or elements are in close contact with one another so that when the sending unit is mounted on the vehicle body as hereinbefore described, each tube will be positioned so that the balls 53 are in contact with the surface and in this regard, a spring 54 reacts between the upper end of the tube 52, within the casing 51, and the upper end of the casing.

Lengthwise movement of tubes or elements 52 within casing 51 causes rotation of a screw shaft 55 also mounted within the casing and being provided with a steeply pitched screw 56 of at least 45°. Tube 52 is correspondingly internally threaded for engagement on the screw shaft 55 and this engages the said threaded portions at intervals within the tube (not illustrated). Because the pitch of the screw threads is at least 45° and preferably greater than 45°, vertical movement of the tube 52 will rotate the screw 56. A bevel gear 57 is secured to the upper end of each of the shafts 55 and this in turn engages a further bevel gear 58 situated at right angles thereto which in turn is connected to a flexible drive cable 59. Each of these bevel gear assemblies and drive cables are contained within an elbow casing 60 situated at the upper ends of the casing 51 as shown schematically in FIG. 9. The cylinder casings 51, elements 52 and screw shafts 55 form part of the aforementioned contour transmitter together with cables 59 and the like. These are detachably secured to the screw plates 50 by any conventional means (not illustrated) and are easily removable from the screw plate 50.

All of the flexible drive cables 59 extend from the sending unit carriage 45 to the surfacing unit carriage 45A and these cables and parts connected thereto as mentioned above, are collectively designated a contour transmitter in FIG. 1. Once again, each drive cable may comprise a conventional fixed flexible outer casing and a rotatable flexible wire cable therein. Other conventional drive means may be substituted.

The carriage 45A of the surfacing unit 13 also includes a screw plate 50A which supports a fixed enclosing casing 61 within which are situated surfacing components collectively designated 62, each one corresponding to and operatively connected to one of the surface sensing elements hereinbefore described. These casings are mounted in a double eccentric bushings 51A and 51B selectively rotatable for limited spatial adjustment purposes in plate 50.

Each surfacing component 62 includes a drive tube 63 having a relatively narrow upper portion 64 and an enlarged lower end 65.

This lower end is provided with gear teeth 66 on part of the surface thereof (see FIGS. 12 and 14) engageable by a worm gear 67 to which the aforementioned flexible drive cable 59 is connected for rotating said worm gear 67 and said drive cable passing downwardly between the narrow portions 64 of adjacent drive tubes 63. The worm gear 67 forms part of the surfacing component 62 which is detachably mounted together with casing 61, upon the screw plate 50A so that rotation of this worm gear, causes the drive tube to raise or lower relative to the lower surface of the screw plate.

A rotatable tube or element 68 is journalled for rotation within the drive tube 63 and is provided, in the present embodiment, with a chisel bit 69 detachably secured within the lower end therof, said bit having a leading edge 70. However, flat or round headed dolly or anvil type bits (not illustrated) may be provided similar in configuration and operation to hand held dollies used in conventional body repair operations, but of course, being considerably smaller.

An elongaged spur gear 71 is secured to the upper end of the tube or element 68 and each of these spur gears meshes with an adjacent spur gear as clearly shown in FIGS. 14 and 15. These spur gears are provided so that the angular position of the leading edges 70 of the bits can be adjusted. These parts form part of the contour transmitter hereinbefore described, and are detachably secured to the screw plate 50A in any conventional manner (not illustrated).

In this regard, reference should be made to FIGS. 15 and 16 which include an actuating spur gear 71A mounted on a fixed shaft 72 extending upwardly from the screw plate and having a projection 73 engaging in a spiral groove 74 on the inner surface of the spur gear. A push-pull element 75 operated from the source of power, moves this projection vertically thus rotating the spur gear up to approximately 180° due to the engagement of the projection 73 within the spiral groove 74. In other words, if the projection is at one end of the groove, say at the upper end, and pressure is applied by the projection, in a downward direction, then the gear 71A will partially rotate as the groove follows the projection until it reaches the lower end of the groove and vice-versa, and as this spur gear is meshed with one of the spur gears 71, rotation of spur gear 71A causes simultaneous and equal rotation of all of the other spur gears and hence the bits 69. In this connection, it will be appreciated that the initial position of the bits is such that they all face in one direction and when the spur gear 71A is moved or partially rotated, then they all rotate the same amount as will hereinafter be explained.

The narrow portion 64 of the drive tubes, is cut away in part allowing worm gear 67 to contact with gear teeth 66. The portion bearing the gear teeth 66 extends the full length of the drive tube so that the drive tube together with the rotatable tube 68 and bit 69 can move from the uppermost position shown in FIG. 13 towards the lowermost position shown in FIG. 14 and vice-versa.

It will be noted that the depth of the spur gears 71 is not sufficient to allow this full movement between adjacent elements, but of course it will be appreciated that any change in contour is gradual so that adjacent spur gears will always be meshed one with the other although a considerable range of movement is possible between a bit at one side of the casing 61 and a bit at the opposite or diametrical side of the casing 61.

Regardless of the relative position of the spur gear engaging with the splined spur gear 71A, they will always be engaged.

As mentioned previously, although the drawings show chisel type cutting bits 69, nevertheless if the device is to be used as an anvil or dolly, these can be replaced with planar anvil or dolly type bits (not illustrated). Under these circumstances, it will be appreciated that the worm gear 67 together with the gear teeth 66, will enable the device with the anvil type bits, to be used as a dolly or anvil as backlash or upward movement of the rotatable tubes and drive tubes cannot occur because of the worm drive effect. This is because upward pressure, as by a blow, cannot rotate the worm gear 67, as such a drive (worm gear and rack or pinion) is one way.

In usual operation, the sending or sensing and surfacing units are secured back to back as by one or more temporary nut and bolt assemblies 71B and then the surfacing unit is positioned over the damaged portion 11 with the sending unit attached to it. Since the units are secured temporarily back to back as hereinbefore described, with the connector pieces 29 temporarily between corresponding leg assemblies, and corresponding pivot pins 22 engaged one with the other, the positioning of the legs of the surfacer to the contour of the area surrounding the damaged portion will simultaneously set the leg lengths of the sender. The sender is then removed and because its corresponding legs have been adjusted, the sender is then readily positionable to the corresponding contour on the other side of the vehicle since the leg lengths allow locating in only the one place. Alternatively, the leg lengths of sender can be adjusted separately after the surfacer legs have been adjusted by equalizing the corresponding legs of the sending unit.

When the sending unit is in position, all of the balls 53 are engaged upon the undamaged surface of the body due to the extension springs 54 and each tube 52 is positioned relative to the casing 51 which positioning has rotated the screw rods 55 by the necessary amount. These amounts are transmitted individually to the bits on the surfacing unit as hereinbefore described and the bits are adjusted so that the leading edges are facing the direction of travel of the carriage. The springs 54 extend cylindrical casings 52 and balls 53 thus causing rotation of screws 55 and gears 57 and 58 and drive shaft 59. This also rotates worm gear 67 on the surfacing unit and raises or lowers the bit 69 by a similar amount.

A controller 76 is programmed so that the desired movement of the carriage of the units, both vertically and horizontally or within a defined perimeter, is initiated through the drive cables 48 and 49 and 48A and 49A whereupon the carriages will traverse automatically as programmed.

The controller is similar to conventional numerical control apparatus which is common in industrial machining operations. Preferably, it accepts "perimeter-ring" (the outline of the damaged area) to avoid inefficiency of traversing the whole area within the frame and to avoid possible contact of surfacing bits with undamaged areas.

This removes paint and filler from the damaged area and produces a contour identical to that being tracked by the sending unit with the leading edges of the chisels adjusting due to the control by the individual balls of the sending unit.

Alternatively, the damaged surface is urged by mechanical means such as hammering or beating against flat headed or planar anvil or dolly type bits until the damaged surface corresponds approximately to the surface covered by the sending unit whereupon it can be filled and surfaced with the surfacing bits being substituted for the anvil or dolly type bits. In either case, the axial position of the bits cannot change within the surfacer due to the engagement of the gear teeth 66 with worm gear 67.

Reference should next be made to FIG. 17 which shows a schematic view of the drive connections to the units.

Under certain circumstances, it is desirable, especially in dolly back-up operations in which the movement is irregular and thus being most often properly controlled by the operator, to have a control additional to the automatic controller 76 and this is indicated by reference character 77 in FIG. 17.

It consists of a multi-directional switch having a manually operable switch lever 78 which can be moved in any one of four directions so that it completes a circuit through segments 79A, 79B, 79C or 79D.

79A, 79B, 79C and 79D correspond to the four directions that the vertical and horizontal screws turn. The width of the contact segments together with the contact arm of the center pole 78 determines the allowable ratio of any two directions which the overide allows response to. This overide switch may be considered as a switch with contacts spaced on a circle numbered with four directions, with the north and south directions corresponding to the two vertical directions and with the east and west directions corresponding to the horizontal directions. The center segment is not normally in contact being centered by spring pressure (shown schematically by reference character 80). If, for example, upward or vertical movement is wanted, the segment 79A is contacted by the switch pull 78 sending current through the controller and causing the screw to move the carriage up.

Since the positioning of the surfacer head, in its operating location, is fixed by the length of legs and since much of the filler material profiling and dolly back-up requires progressive lessening of the distance to attain final profile, a differential screw assembly 81 is provided and shown in FIG. 9. This assembly is set in the surfacer screw plate 50A and adjusts by raising and lowering the block 82 within which the surfacer head is seated via the eccentrics 51A and 51B.

The purpose of the differential screw is to provide both quick adjustment of the surfacing head distance from work surface for gross removal and dolly work and also the precise distancing in finishing. Although measured in seconds and fractions of seconds it does allow the speedier adjustment by operator. Although the legs of surfacer will sometimes be adjusted after the back-to-back adjustment imparted by placement over damaged area, it will often be advantageous to have vertical adjustment capability of differential screw, i.e. where the contours of corresponding panels are not identical and to allow for inexactness in placement of sender unit on its panel relative to the surfacer. Perhaps greatest value is in varying distance in dolly operation as damaged area is progressively restored while minimizing stretching of material.

One type of differential screw assembly is shown and is similar to that illustrated in Volume 4 of *INGENIOUS MECHANISMS FOR DESIGNERS AND INVENTORS*, pages 297 and 298.

Briefly, a nut block 83 extends from block 82 and engages around a screw threaded drive shaft 84, rotation of which by handwheel 85, raises and lowers the nut block 83.

The handwheel 85 is a sliding fit on the square ended shaft portion of shaft 84.

Part of the cylindrical length of the drive shaft 84 bears in a bushing 86 which in turn is externally screw threadably engaged within the fixed portion 87. Shoulders 88 of the bushing serve to limit its axial movement in the portion 87. In addition, the upper shoulder is designed as a straight tooth clutch 89, the other member of which is developed from the hub bend of the handwheel and identified by reference character 90. A spring 91 maintains the two parts 89 and 90 of the clutch, in a normally disengaged relationship.

Since another pair of shoulders 92 fixed on the drive shaft, prevent its axial movement, rotating the handwheel produces a vertical travel of the nut block 83. The nut block is provided with a smaller pitch thread than the external threads on the bushing.

When the clutch is disengaged, the bushing remains stationary while the drive shaft 84 is rotated by the handwheel 85 and the nut block travels a distance equal to the pitch of the screw threads thereof, each revolution of the handwheel.

However, to produce speed differential and fine adjustment of the vertical relationship of the surfacer unit, the clutch elements 89 and 90 are engaged and the bushing now rotating in unison with the drive shaft 84, also moves axially. This axial movement of the bushing is transmitted to the drive shaft through the thrust against the shoulders 92. Movement of the bushing and drive shaft is opposite to the direction of the nut block but since the bushing and drive shaft only move a distance equal to the pitch of the bushing, per revolution, the net result is to reduce the travel of the nut block to a distance equal to the difference of the pitches of the bushing and the nut block.

FIGS. 18 through 21 show a bow assembly collectively designated 93 which is adapted to be detachably secured to either the sending or surfacing units 12 or 13 or both.

In conjunction with this bow assembly, a flexible transmitting cable assembly 59 is required in order to transmit the curvature set by the bow, to the surfacing unit.

It will of course be appreciated that if the sending unit is used as the surfacer head, then a replacement of the head on the sending unit is required because the bits at this end of the head are the active or working parts of the surfacer.

The reason for the bow assembly is that it can be used on non-compound curves or very slightly compound curves and enables curves which one might term "symmetrical arcs" to be transmitted.

In shop operations, it is found that perhaps one third of the curves are of this type thus allowing the use of the less sophisticated bow on one frame, either the surfacer frame or the sending frame, thus realising an economy in the provision of equipment since most of the cost is represented by the basic surfacer and sending units.

The bow assembly 93 is secured to the frame which can be situated in any convenient location, the curve of the bow can be set by the operator whereupon this curvature is transmitted to the surfacer unit on the work piece by the transmitting cable assembly.

The bow assembly comprises a pair of brackets 94 which may be detachably secured to the frame 15A by means of screws or bolts 95 or quick securing means. An upstanding vertical flange 96 extends between the brackets and carries a bow rod 97 parallel to the frame as clearly shown.

The bow assembly collectively designated 98, is mounted upon the bow rod 97 by a pair of squeeze positioners 99 secured to each end of a flexible strip 100 forming the bow. These squeeze positioners are apertured as at 101 and are maintained in the diverging or apart position by means of V-springs 102 reacting therebetween as clearly shown in FIG. 20, it being understood that the parts 99 are pivotally secured to the ends 103 of the bow 100.

In other words, when they are in the position shown in FIG. 20, they cannot be moved along the bow rod 97 due to frictional interference but when they are squeezed together, this frictional interference is removed thus enabling the resilient strip 100 to be adjusted as to the arcuate curvatures thereof by moving the ends 103 towards or away from one another along the rod 97. Release of the squeeze positioners locks the bow in position upon the rod thus setting the curvature of the bow 100.

A positioning link 104 slidably engages the bow rod 97 intermediate the ends thereof by means of the apertured block 105 and includes a vertical link 106 extending upwardly therefrom to which is attached a positioning arm 107 having a ring mounting 108 adjacent the end attached to the link 106. This ring bearing 108 receives one end of the contour transmitter 59 with the balls thereof engageable upon the flexible bow 100 so that as the device is traversed over the bow 100, the contour of the bow will be transmitted to the surfacer unit in a manner similar to traversing the sender unit over the surface of the vehicle body being used as a pattern.

The positioning arm 107 is set in a support block 109 with a sliding fit. The support block is removably secured to the screw plate 50 of the carriage 45 so that movement of the carriage will move the positioning arm and link together with the block 105 along the bow rod 97 hence traversing the balls along the curved length of the bow plate or strip 100.

In operation, the operator secures the bow assembly to either a surfacing or sender frame positioning the curve of the bow to correspond to that of the work surface and since the bow is used only on those surfaces curving in one direction, placement of the bow can be to either direction of the work surface.

Care is required in ensuring that the bow assembly and frame are parallel to the curve being repaired.

Then by using the squeeze positioners, the curve of the bow is selected to correspond to that curve desired on the work surface and the remaining operation is then similar to the regular operation.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A vehicle body surfacing assembly for use with a source of power and upon a vehicle body comprising in combination a sending unit and surfacing unit, means to detachably secure said surfacing unit over the area of the associated vehicle body requiring repair and means to detachably secure said sending unit over means having contours similar to the contours of the portion of the vehicle body requiring repair, each of said units including a rectangular frame, a carriage mounted on each of said frames for movement relative thereto in one direction between the ends of the frame and in another direction between the sides of the frame, means operative to move said carriages connected to said source of power, a plurality of movable surfaces sensing element assemblies mounted in said carriage of said sending unit and contacting the means having contours similar to the contours of the portion of the vehicle body requiring repair, said assemblies each including a surface sensing element movable in a direction perpendicular to the plane of the frame of said sending unit, a plurality of surfacing components mounted in the carriage of said surfacing unit movable in a direction perpendicular to the plane of the frame of said surfacing unit, and contour transmitting drive cable means operatively extending between each of said surface sensing elements and a corresponding surfacing component whereby movement of each of said surface sensing elements, in a direction perpendicular to the plane of the frame, is reproduced in the corresponding surface component, each of said surfacing components having surface treatment means on the lower end thereof operatively engaging the surface of the vehicle body requiring repair.

2. The invention according to claim 1 in which said means having contours similar to the contours of the portion of the vehicle body requiring repair comprises a corresponding portion of the vehicle body, said carriage of said sending unit including a screw plate, each of said surface sensing element assemblies comprising a cylindrical casing extending perpendicular from said screw plate, an elongated element slidable lengthwise within said casing, means to prevent rotation of said element relative to said casing, a sensing component journalled for rotation in the lower end of said element and contacting the surface of the vehicle body, a steeply pitched, threaded screw shaft also mounted in said casing, means operatively connected between said elongated element and said screw shaft whereby lengthwise movement of said elongated element causes corresponding rotation of said screw shaft; and gear means operatively connected between said screw shaft on one end of said contour transmitting drive cable means for rotating said drive cable means.

3. The invention according to claim 1 in which said surfacing unit includes a screw plate, each of said movable surfacing components including a lengthwise movable drive tube, gear means operatively connected between said drive tube and the other end of said contour transmitting drive cable means whereby rotation of said gear means causes corresponding lengthwise movement of said drive tube, an element journalled for selective rotation within said drive tube, a surface treatment bit secured at the lower end of said element and means to selectively rotate said element to position the bit as required.

4. The invention according to claim 3 in which said means to selectively rotate said element includes means interconnecting all of said elements and means operatively connected to said source of power to rotate said elements simultaneously.

5. The invention according to claim 2 in which said surfacing unit includes a screw plate, each of said movable surfacing components including a lengthwise movable drive tube, gear means operatively connected between said drive tube and the other end of said contour transmitting drive cable means whereby rotation of said gear means causes corresponding lengthwise movement of said drive tube, an element journalled for selective rotation within said drive tube, a surface treatment bit secured at the lower end of said element and means to selectively rotate said element to position the bit as required.

6. The invention according to claim 5 in which said means to selectively rotate said element includes means interconnecting all of said elements and means operatively connected to said source of power to rotate said elements simultaneously.

7. The invention according to claim 1 in which said sending unit and said surfacing unit each includes a pair of spaced and parallel side rails and a pair of spaced and parallel end rails, a carriage support block mounted upon each side rail for movement therealong, said means operatively connecting said carriage to said source of power being operatively connected to one of said blocks to move same along said side rail, a carriage support rod extending between said blocks, said carriage being mounted for movement upon said support rod, a drive screw also extending between said blocks, means operatively connecting said drive screw to said one of said blocks for rotating said drive screw and means operatively connecting said drive screw to said carriage whereby rotation of said drive screw moves said carriage along said carriage support rod.

8. The invention according to claim 2 in which said sending unit and said surfacing unit each includes a pair of spaced and parallel side rails and a pair of spaced and parallel end rails, a carriage support block mounted upon each side rail for movement therealong, said means operatively connecting said carriage to said source of power being operatively connected to one of said blocks to move same along said side rail, a carriage support rod extending between said blocks, said carriage being mounted for movement upon said support rod, a drive screw also extending between said blocks, means operatively connecting said drive screw to said one of said blocks for rotating said drive screw and means operatively connecting said drive screw to said carriage whereby rotation of said drive screw moves said carriage along said carriage support rod.

9. The invention according to claim 3 in which said sending unit and said surfacing unit each includes a pair of spaced and parallel side rails and a pair of spaced and parallel end rails, a carriage support block mounted upon each side rail for movement therealong, said means operatively connecting said carriage to said source of power being operatively connected to one of said blocks to move same along said side rail, a carriage support rod extending between said blocks, said carriage being mounted for movement upon said support rod, a drive screw also extending between said blocks, means operatively connecting said drive screw to said one of said blocks for rotating said drive screw and means operatively connecting said drive screw to said carriage whereby rotation of said drive screw moves said carriage along said carriage support rod.

10. The invention according to claim 4 in which said sending unit and said surfacing unit each includes a pair of spaced and parallel side rails and a pair of spaced and parallel end rails, a carriage support block mounted upon each side rail for movement therealong, said means operatively connecting said carriage to said source of power being operatively connected to one of said blocks to move same along said side rail, a carriage support rod extending between said blocks, said carriage being mounted for movement upon said support rod, a drive screw also extending between said blocks, means operatively connecting said drive screw to said one of said blocks for rotating said drive screw and means operatively connecting said drive screw to said carriage whereby rotation of said drive screw moves said carriage along said carriage support rod.

11. The invention according to claim 5 in which said sending unit and said surfacing unit each includes a pair of spaced and parallel side rails and a pair of spaced and parallel end rails, a carriage support block mounted upon each side rail for movement therealong, said means operatively connecting said carriage to said source of power being operatively connected to one of said blocks to move same along said side rail, a carriage support rod extending between said blocks, said carriage being mounted for movement upon said support rod, a drive screw also extending between said blocks, means operatively connecting said drive screw to said one of said blocks for rotating said drive screw and means operatively connecting said drive screw to said carriage whereby rotation of said drive screw moves said carriage along said carriage support rod.

12. The invention according to claim 6 in which said sending unit and said surfacing unit each includes a pair of spaced and parallel side rails and a pair of spaced and parallel end rails, a carriage support block mounted upon each side rail for movement therealong, said means operatively connecting said carriage to said source of power being operatively connected to one of said blocks to move same along said side rail, a carriage support rod extending between said blocks, said carriage being mounted for movement upon said support rod, a drive screw also extending between said blocks, means operatively connecting said drive screw to said one of said blocks for rotating said drive screw and means operatively connecting said drive screw to said carriage whereby rotation of said drive screw moves said carriage along said carriage support rod.

13. The invention according to claim 1 in which said means having contours similar to the contours of the portion of the vehicle body requiring repair includes a bow assembly for use with said surfacing unit and comprising a bow supporting rod, means mounting said rod upon said frame parallel to the ends thereof, a flexible and resilient bow strip, means mounting said strip to said rod, whereby the arc of said bow strip can be selectively adjusted within limits, and means to operatively connect said sensing elements to said bow strip whereby movement of said carriage moves said last mentioned means along said bow strip.

14. The invention according to claim 13 in which said means mounting said bow strip to said rod includes at least one squeeze positioner secured to one end of said bow strip and frictionally engaging with said bow supporting rod.

15. The invention according to claim 1 in which said means to detachably secure said units to a vehicle body includes a plurality of leg assemblies secured to said frame of each of said units and including means on the distal ends of said leg assemblies to detachably secure said leg assemblies to the vehicle body, means to selectively move said leg assemblies along said frame, means to position said leg assemblies radially with respect to said frame and means to adjust the distance of the distal ends of said leg assemblies from said frame.

16. The invention according to claim 15 which includes means to secure the frames of said units in back to back relationship for mutual adjustment of the corresponding leg assemblies of said units, said last mentioned means including means to detachably interconnect the corresponding leg assemblies for mutual radial movement one relative to the other, and means to interconnect the corresponding leg assemblies for mutual adjustment of the distance between the distal ends of said leg assemblies relative to the respective frames, said last two mentioned means detachably interconnecting said corresponding leg assemblies for mutual movement along the frames of said units.

* * * * *